(12) United States Patent
Groenendaal et al.

(10) Patent No.: US 7,691,937 B2
(45) Date of Patent: Apr. 6, 2010

(54) POLYMERIC DISPERSANTS CONTAINING (METH)ACRYLOYLOXYBENZOIC ACID

(75) Inventors: Bert Groenendaal, Sinaai (BE); Geert Deroover, Lier (BE)

(73) Assignee: Agfa Graphics NV, Mortsel (BE)

( * ) Notice: Subject to any disclaimer, the term of this patent is extended or adjusted under 35 U.S.C. 154(b) by 262 days.

(21) Appl. No.: 11/815,471

(22) PCT Filed: Jan. 26, 2006

(86) PCT No.: PCT/EP2006/050456

§ 371 (c)(1),
(2), (4) Date: Aug. 3, 2007

(87) PCT Pub. No.: WO2006/082160

PCT Pub. Date: Aug. 10, 2006

(65) Prior Publication Data

US 2009/0124752 A1   May 14, 2009

Related U.S. Application Data

(60) Provisional application No. 60/653,776, filed on Feb. 17, 2005, provisional application No. 60/653,765, filed on Feb. 17, 2005.

(30) Foreign Application Priority Data

Feb. 4, 2005 (EP) .................................. 05100787
Feb. 4, 2005 (EP) .................................. 05100789

(51) Int. Cl.
C08F 30/00 (2006.01)
C08L 41/00 (2006.01)

(52) U.S. Cl. ................ 524/547; 428/411.1; 428/457; 428/500; 428/522; 522/182; 583/160; 583/161; 524/555; 524/556; 524/558; 524/559; 526/240; 526/287; 526/312; 526/317.1; 526/318; 526/318.1; 526/319; 526/326; 526/329.2

(58) Field of Classification Search ............ 523/160, 523/161; 524/547, 548, 553, 555, 556, 558, 524/559; 526/240, 266, 280, 312, 317.1, 526/318, 318.1, 329.2, 287, 319, 326; 428/411.1, 428/457, 500, 522; 522/182
See application file for complete search history.

(56) References Cited

U.S. PATENT DOCUMENTS

| | | | |
|---|---|---|---|
| 4,656,226 A | 4/1987 | Hutchins et al. | |
| 5,292,591 A | 3/1994 | Teyssie et al. | |
| 5,859,113 A | 1/1999 | McIntyre et al. | |
| 5,891,935 A * | 4/1999 | Schneider | ............... 523/177 |
| 6,407,187 B1 | 6/2002 | Matyjaszewski et al. | |
| 6,413,306 B1 | 7/2002 | Kraiter et al. | |
| 6,605,664 B2 * | 8/2003 | Kanou et al. | ............... 524/504 |
| 6,652,634 B1 | 11/2003 | Akers, Jr. et al. | |
| 2003/0081092 A1 | 5/2003 | Ishizuka et al. | |
| 2004/0063881 A1 | 4/2004 | Lewis et al. | |
| 2004/0102541 A1 | 5/2004 | Sacoto et al. | |

FOREIGN PATENT DOCUMENTS

| | | |
|---|---|---|
| CA | 2 157 361 C | 9/1994 |
| EP | 1 029 898 A2 | 8/2000 |
| EP | 1 182 218 A1 | 2/2002 |
| EP | 0 996 689 B1 | 12/2002 |
| JP | 11-060657 A | 3/1999 |
| JP | 2004-002535 A | 1/2004 |
| WO | 03/066685 A2 | 8/2003 |

OTHER PUBLICATIONS

Official Communication for PCT Application No. PCT/EP2006/050456; mailed on Apr. 26, 2006.
Spinelli, "Polymeric Dispersants in Ink Jet Technology," Advanced Materials. 1998, vol. 10, No. 15, p. 1215-1218.
Spinelli, "GTP and Its Use in Water Based Pigment Dispersants and Emulsion Stabilizers, " Proc. of 20th Int. Conf. Org. Coat. Sci. Technol.. New Platz, N.Y.: State Univ. N.Y., Inst. Mater. Sci. p. 511-518, 1994.
Louwet Frank et al.; "Stable Pigment Dispersions"; U.S. Appl. No. 11/815,473, filed Aug. 3, 2007.
Louwet Frank et al.; "Stable Pigment Dispersions"; U.S. Appl. No. 11/815,481, filed Aug. 3, 2007.

* cited by examiner

*Primary Examiner*—David Wu
*Assistant Examiner*—Marie Reddick
(74) *Attorney, Agent, or Firm*—Keating & Bennett, LLP

(57) ABSTRACT

A polymeric dispersant having a block copolymer structure or a segmented oligomer structure wherein the block copolymer structure or segmented oligomer structure includes a segment polymerized by monomers according to Formula (I):

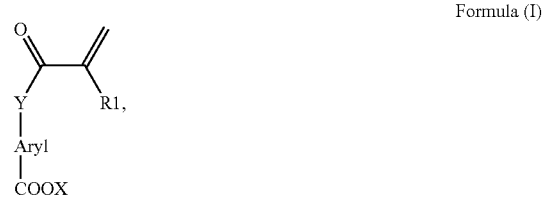

Formula (I)

wherein;
R1 represents hydrogen or methyl;
Y represents O, S, or NH;
Aryl represents an aromatic group or a heteroaromatic group; and
X represents hydrogen, an alkyl group, or a cation. A process for manufacturing the polymeric dispersant and the application of the polymeric dispersant in pigment dispersions, inkjet inks, and colored layers.

12 Claims, No Drawings

POLYMERIC DISPERSANTS CONTAINING (METH)ACRYLOYLOXYBENZOIC ACID

CROSS-REFERENCE TO RELATED APPLICATIONS

This application is a 371 of PCT/EP2006/050456, filed Jan. 26, 2006. This application claims the benefit of U.S. Provisional Application No. 60/653,765, filed Feb. 17, 2005 and U.S. Provisional Application No. 60/653,776, filed Feb. 17, 2005, which are incorporated by reference. In addition, this application claims the benefit of European Application No. 05100787.0, filed Feb. 4, 2005 and European Application No. 05100789.6, filed Feb. 4, 2005, which are also incorporated by reference.

BACKGROUND OF THE INVENTION

1. Field of the Invention

The present invention relates to novel polymeric dispersants and to their use in pigment dispersions for inkjet inks, printing inks, and coating compositions for colored layers.

2. Description of the Related Art

Pigment dispersions are made using a dispersant. A dispersant is a substance for promoting the formation and stabilization of a dispersion of pigment particles in a dispersion medium. Dispersants are generally surface-active materials having an anionic, cationic, or non-ionic structure. The presence of a dispersant substantially reduces the dispersing energy required. Dispersed pigment particles may have a tendency to re-agglomerate after the dispersing operation due to mutual attraction forces. The use of dispersants also counteracts the re-agglomeration tendency of the pigment particles.

The dispersant has to meet particularly high requirements when used for dispersing pigments. Inadequate dispersing manifests itself as increased viscosity in liquid systems, loss of brilliance, and hue shifts. Particularly good dispersion of the pigment particles is required in the case of inks for use in inkjet printers so as to ensure unimpeded passage of the pigment particles through the nozzles of the print head which are usually only a few micrometers in diameter. In addition, pigment particle agglomeration and the associated blockage of the printer nozzles has to be avoided during the standby periods of the printer.

Polymeric dispersants contain in one part of the molecule so-called anchor groups, which adsorb onto the pigments to be dispersed. In a spatially separate part of the molecule, polymeric dispersants have a polymer chain which sticks out and whereby pigment particles are made compatible with the dispersion medium, i.e., stabilized.

The properties of polymeric dispersants depend on both the nature of the monomers and their distribution in the polymer. Polymeric dispersants obtained by randomly polymerizing monomers (e.g., monomers A and B polymerized into ABBAABAB) or by polymerizing alternating monomers (e.g., monomers A and B polymerized into ABABABAB) generally result in a poor dispersion stability. Improvements in dispersion stability have been obtained using graft copolymer and block copolymer dispersants.

Graft copolymer dispersants consist of a polymeric backbone with side chains attached to the backbone. CA 2157361 (DU PONT) discloses pigment dispersions made by using a graft copolymer dispersant with a hydrophobic polymeric backbone and hydrophilic side chains. Other graft copolymer dispersants are disclosed in U.S. Pat. No. 6,652,634 (LEXMARK), EP 1182218 A (DU PONT), and U.S. 2004/0102541 (LEXMARK).

Block copolymer dispersants having hydrophobic and hydrophilic blocks have also been disclosed. EP 996689 A (DU PONT) discloses an AB block copolymer dispersant with a polymeric A segment of polymerized glycidyl(meth)acrylate monomers reacted with an aromatic or aliphatic carboxylic acid, and a polymeric B segment of polymerized alkyl(meth)acrylate monomers or hydroxyalkyl(meth)acrylate monomers. U.S. Pat. No. 6,413,306 (DU PONT) discloses ABC block copolymer dispersants with a polymeric A segment of polymerized alkyl(meth)acrylate, aryl(meth)acrylate or cyclo alkyl(meth)acrylate, a polymeric B segment of polymerized alkyl amino alkyl(meth)acrylate monomers with a quaternized alkyl group, and a polymeric C segment of polymerized hydroxyalkyl(meth)acrylate monomers.

U.S. Pat. No. 5,859,113 (DU PONT) discloses a pigment dispersion useful for forming coating compositions containing dispersed pigment, a carrier liquid, and an AB-block polymer dispersant (binder); the AB block polymer has a number average molecular weight of about 5,000-20,000 and contains 20-80% by weight of a polymeric A segment and correspondingly 80-20% by weight of a polymeric B segment; wherein the polymeric A segment of the block polymer is of polymerized glycidyl(meth)acrylate monomers reacted with an acid from the group of aromatic carboxylic acids or aliphatic carboxylic acids; and the B segment is of polymerized alkyl(meth)acrylate monomers having 1-12 carbon atoms in the alkyl group, hydroxy alkyl (meth)acrylate monomers having about 1-4 carbon atoms in the alkyl group; and wherein the weight ratio of pigment to binder in the dispersion is about 1/100-200/100.

The method of group transfer polymerization (GTP) used for synthesis of AB block copolymers is disclosed by SPINELLI, Harry J. GTP and its use in water based pigment dispersants and emulsion stabilizers, Proc. of 20th Int. Conf. Org. Coat. Sci. Technol., New Platz, N.Y.: State Univ. N.Y., Inst. Mater. Sci. pp. 511-518. Other techniques include atom transfer radical polymerization (ATRP), RAFT (reversible addition-fragmentation chain transfer polymerization), MADIX (reversible addition-fragmentation chain transfer process, using a transfer active xanthate), catalytic chain transfer (e.g., using cobalt complexes), or nitroxide (e.g., TEMPO) mediated polymerizations.

Although a wide variety of polymeric dispersants has been proposed, the dispersion quality and stability of pigment dispersions still need further improvement.

SUMMARY OF THE INVENTION

In order to overcome the problems described above, preferred embodiments of the present invention provide a new polymeric dispersant for preparing pigment dispersions exhibiting a high dispersion stability and a high optical density.

Another preferred embodiment of the present invention provides a new polymeric dispersant which can be tailor-made by a well-controlled polymerization.

Further preferred embodiments of the present invention will become apparent from the description hereinafter.

It has been surprisingly discovered that pigment dispersions with high stability and high optical density are obtained using tailor-made block copolymers or segmented oligomers with methacryloyloxybenzoic acid as a monomer.

Further preferred embodiments of the present invention have been achieved with a polymeric dispersant having a block copolymer structure or a segmented oligomer structure wherein the block copolymer structure or segmented oligomer structure comprises a segment polymerized by monomers according to Formula (I):

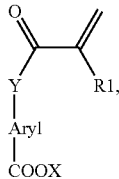

Formula (I)

wherein,
R1 represents hydrogen or methyl;
Y represents O, S, or NH;
Aryl represents an aromatic group or a heteroaromatic group; and
X represents hydrogen, an alkyl group, or a cation.

Further advantages and preferred embodiments of the present invention will become apparent from the following description.

The polymeric dispersant according to preferred embodiments of the present invention can be used to prepare inks and ink sets for inkjet printing applications. The polymeric dispersant can also be used for pigment dispersions used in imaging materials, e.g., photographic and photothermographic materials, to improve the image quality. The sharpness of the images produced with these materials can be improved by adding the pigment dispersion to the imaging layer or in a separate colored layer, i.e., an anti-halation layer. The optical density of an anti-halation layer is preferably at least about 0.5, since below an optical density of about 0.5 the anti-halation sharpness improves much more by addition of a colorant.

Other features, elements, processes, steps, characteristics and advantages of the present invention will become more apparent from the following detailed description of preferred embodiments of the present invention.

DETAILED DESCRIPTION OF PREFERRED EMBODIMENTS

Definitions

The term "dye" means a colorant having a solubility of about 10 mg/L or more in the medium in which it is applied and under the ambient conditions pertaining.

The term "pigment" is defined in DIN 55943 as an inorganic or organic, chromatic or achromatic coloring agent that is practically insoluble in the application medium under the pertaining ambient conditions, hence having a solubility of less than about 10 mg/L therein.

The term "dispersion", as used in disclosing the preferred embodiments of the present invention, means an intimate mixture of at least two substances, one of which, called the dispersed phase or colloid, is uniformly distributed in a finely divided state through the second substance, called the dispersion medium.

The term "dispersant", as used in disclosing the preferred embodiments of the present invention, means a substance for promoting the formation and stabilization of a dispersion of one substance in a dispersion medium.

The term "copolymer", as used in disclosing the preferred embodiments of the present invention, means a macromolecule in which two or more different species of monomers are incorporated into a polymer chain.

The term "block copolymer", as used in disclosing the preferred embodiments of present invention, means a copolymer in which the monomers occur in relatively long alternate sequences in a chain.

The term "segmented oligomer", as used in disclosing the preferred embodiments of the present invention, is similar to a block copolymer except that the blocks or segments include a low number of monomers, e.g., an AB-type segmented oligomer having 3 A-monomers and 9 B-monomers.

The term "initiating radical", as used in disclosing the preferred embodiments of the present invention, means a free radical that is derived from the initiator.

The term "propagating radical", as used in disclosing the preferred embodiments of the present invention, means a radical that has added one or more monomers and is capable of adding further monomers.

The term "spectral separation factor" as used in disclosing the preferred embodiments of the present invention means the value obtained by calculating the ratio of the maximum absorbance $A_{max}$ (measured at wavelength $\lambda_{max}$) over the absorbance determined at the wavelength $\lambda_{max}+200$ nm.

The abbreviation "SSF" is used in disclosing the preferred embodiments of the present invention for spectral separation factor.

The abbreviation "SSA" is used in disclosing the preferred embodiments of the present invention for 4-styrene sulfonic acid.

The abbreviation "SSA-Na" is used in disclosing the preferred embodiments of the present invention for sodium 4-styrenesulfonate.

The abbreviation "VBA" is used in disclosing the preferred embodiments of the present invention for 4-vinyl benzoic acid.

The abbreviation "VBA-Na" is used in disclosing the preferred embodiments of the present invention for sodium 4-vinyl benzoate.

The abbreviation "DP" is used in disclosing the preferred embodiments of the present invention for degree of polymerization.

The abbreviation "pd" is used in disclosing the preferred embodiments of the present invention for polydispersity.

The term "alkyl" means all variants possible for each number of carbon atoms in the alkyl group, i.e., for three carbon atoms: n-propyl and isopropyl; for four carbon atoms: n-butyl, isobutyl, and tertiary-butyl; for five carbon atoms: n-pentyl, 1,1-dimethyl-propyl, 2,2-dimethylpropyl, and 2-methylbutyl etc.

The term "acyl group" means —(C=O)-aryl and —(C=O)-alkyl groups.

The term "aliphatic group" means saturated straight chain, branched chain, and alicyclic hydrocarbon groups.

The term "unsaturated aliphatic group" means straight chain, branched chain, and alicyclic hydrocarbon groups which contain at least one double or triple bond.

The term "aromatic group" as used in disclosing the preferred embodiments of the present invention means an assemblage of cyclic conjugated carbon atoms, which are characterized by large resonance energies, e.g., benzene, naphthalene, and anthracene.

The term "alicyclic hydrocarbon group" means an assemblage of cyclic carbon atoms, which do not form an aromatic group, e.g., cyclohexane.

The term "substituted" as used in disclosing the preferred embodiments of the present invention means that one or more of the carbon atoms and/or that a hydrogen atom of one or more of carbon atoms in an aliphatic group, an aromatic group, or an alicyclic hydrocarbon group, are replaced by an oxygen atom, a nitrogen atom, a halogen atom, a silicon atom, a sulphur atom, a phosphorous atom, selenium atom, or a tellurium atom. Such substituents include hydroxyl groups, ether groups, carboxylic acid groups, ester groups, amide groups, and amine groups.

The term "heteroaromatic group" means an aromatic group wherein at least one of the cyclic conjugated carbon atoms is replaced by a non-carbon atom such as a nitrogen atom, a sulphur atom, an oxygen atom, or a phosphorous atom.

The term "heterocyclic group" means an alicyclic hydrocarbon group wherein at least one of the cyclic conjugated carbon atoms is replaced by a non-carbon atom such as an oxygen atom, a nitrogen atom, a phosphorous atom, a silicon atom, a sulphur atom, a selenium atom, or a tellurium atom.

Polymeric Dispersant

The polymeric dispersant according to a preferred embodiment of the present invention is a block copolymer or a segmented oligomer wherein the block copolymer structure or segmented oligomer structure comprises a segment polymerized by monomers according to Formula (I):

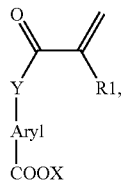

Formula (I)

wherein,
R1 represents hydrogen or methyl;
Y represents O, S, or NH;
Aryl represents an aromatic group or a heteroaromatic group; and
X represents hydrogen, an alkyl group, or a cation.

Preferably the cation represents ammonium, sodium, potassium, lithium, or a quaternary amine.

Preferably the polymeric dispersant according to a preferred embodiment of the present invention is a block copolymer or segmented oligomer including a segment polymerized by monomers represented by Formula (II):

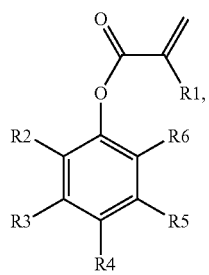

Formula (II)

wherein,
R1 represents hydrogen or methyl;
R2, R3, R4, R5, and R6 are each independently selected from the group consisting of hydrogen, alkoxy group, acyl group, carboxylic acid group, carboxylate group, alkyl, and alkenyl; and
characterized in that at least one of R2, R3, R4, R5, or R6 is a carboxylic acid or a salt thereof.

A preferred example of the polymeric dispersant according to a preferred embodiment of the present invention is a block copolymer or segmented oligomer including a segment polymerized by

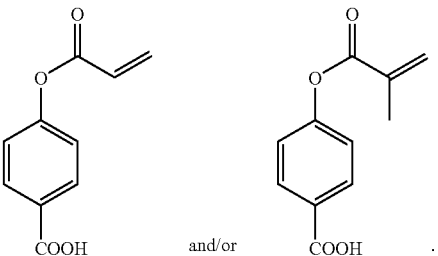

The block copolymer or segmented oligomer can be any of AB, ABA, ABAB, ABABA, ABC, ABCBA . . . -type block copolymers or segmented oligomers, wherein A, B, and C represent blocks of the same species of monomer. The preferred block copolymer or segmented oligomer is an AB-type block copolymer or segmented oligomer.

The AB-type block copolymer or segmented oligomer contains preferably at least about 14 monomer molecules, more preferably at least about 20 monomer molecules in total.

In one preferred embodiment, the polymeric dispersant contains a higher number of monomers according to Formula (I) than the other monomers present in the block copolymer or segmented oligomer.

Other Monomers

The monomer(s) used in another segment of the polymeric dispersant according to a preferred embodiment of the present invention include: acrylic acid, methacrylic acid, maleic acid (or their salts), maleic anhydride; alkyl(meth)acrylates (linear, branched and cycloalkyl) such as methyl (meth)acrylate, n-butyl(meth)acrylate, tert-butyl(meth)acrylate, cyclohexyl(meth)acrylate, and 2-ethylhexyl(meth)acrylate; aryl(meth)acrylates such as benzyl(meth)acrylate and phenyl(meth)acrylate; hydroxyalkyl(meth)acrylates such as hydroxyethyl(meth)acrylate and hydroxypropyl (meth)acrylate; (meth)acrylates with other types of functionalities (e.g., oxirane, amino, fluoro, polyethylene oxide, phosphate-substituted) such as glycidyl (meth)acrylate, dimethylaminoethyl(meth)acrylate, trifluoroethyl acrylate, methoxypolyethyleneglycol(meth)acrylate and tripropyleneglycol(meth)acrylate phosphate; allyl derivatives such as allyl glycidyl ether; styrenics such as styrene, 4-methylstyrene, 4-hydroxystyrene, 4-acetoxystyrene, and styrenesulfonic acid; (meth)acrylamides (including N-mono and N,N-disubstituted) such as N-benzyl(meth)acrylamide; maleimides such as N-phenyl maleimide, N-benzyl maleimide, and N-ethyl maleimide; vinyl derivatives such as vinylcaprolactam, vinylpyrrolidone, vinylimidazole, vinylnaphthalene, and vinyl halides; vinylethers such as vinylmethyl ether; and vinylesters of carboxylic acids such as vinylacetate, vinylbutyrate, and vinyl benzoate.

In a preferred embodiment, the monomer used in a second segment of the block copolymer or segmented oligomer is styrene.

In another preferred embodiment, the monomer used in a second segment of the block copolymer or segmented oligomer is an alkylacrylate monomer or an aromatic acrylate monomer.

Synthesis of Polymeric Dispersant

The polymeric dispersants according to preferred embodiments of the present invention can be prepared with any suitable method for polymerizing monomers to block copolymers.

In a preferred embodiment, the polymeric dispersant is prepared by reversible addition fragmentation chain transfer polymerization (RAFT). RAFT polymerization has been disclosed in detail in patents WO 98/01478 (DU PONT), U.S. 2004/0024132 (DU PONT), WO 01/77198 (DU PONT), and U.S. Pat. No. 6,642,318 (DU PONT).

Controlled polymerization by RAFT occurs via rapid chain transfer between growing polymer radicals and dormant polymer chains. After initiation, the control agent CTA becomes part of the dormant polymer chain. The key to successful RAFT polymerizations, for producing polymers of controlled molecular weight and low polydispersity, is the presence of a highly efficient dithioester chain transfer agent (CTA), also called RAFT agent. The RAFT agent reacts with either the initiating radical (derived from the initiator) or with the propagating radical, forming a new CTA and eliminating a radical R*, which reinitiates the polymerization. In theory, propagation will continue until no monomer is left and a termination step occurs. After the first polymerization has finished, a second monomer can be added to the system to form a block copolymer.

The source of initiating radicals can be any suitable method of generating free radicals such as those disclosed in the patents WO 98/01478 (DU PONT), U.S. 2004/0024132 (DU PONT), WO 01/77198 (DU PONT), and U.S. Pat. No. 6,642,318 (DU PONT).

The RAFT agent can be any dithioester chain transfer agent disclosed in the patents WO 98/01478 (DU PONT), U.S. 2004/0024132 (DU PONT), WO 01/77198 (DU PONT), and U.S. Pat. No. 6,642,318 (DU PONT).

In a preferred embodiment for preparing the dispersant, the RAFT polymerization is performed in an aqueous medium with a water-soluble RAFT agent.

A preferred water-soluble RAFT agent is 4-cyanopentanoic acid dithiobenzoate.

The synthesis of 4-cyanopentanoic acid dithiobenzoate is a multi-step procedure involving the synthesis of dithiobenzoic acid (DTBA), which subsequently is oxidized to di(thiobenzoyl)disulfide, before final reaction with 4,4'-azobis(4-cyano-pentanoic acid) to yield 4-cyanopentanoic acid dithiobenzoate.

FIG. 1 Synthesis Scheme of 4-cyanopentanoic Acid Dithiobenzoate.

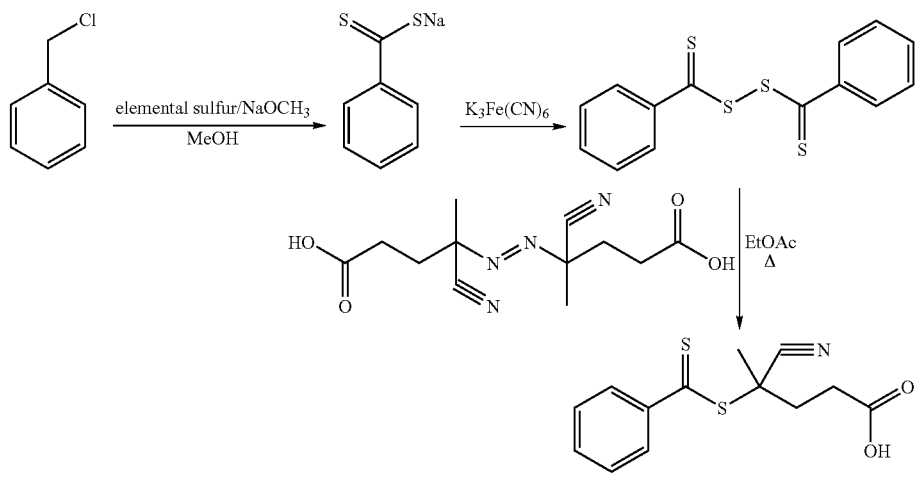

In another preferred embodiment, the polymeric dispersant is prepared by a reversible addition-fragmentation chain transfer process using a transfer active xanthate (MADIX). This process for macromolecular design via interchange of xanthates is described in more detail by WO 98/58974 (RHODIA CHIMIE).

Pigment Dispersion

The pigment dispersion including the polymeric dispersant according to preferred embodiments of the present invention contains at least two other components: (i) a pigment and (ii) a dispersion medium.

The pigment dispersion may further contain at least one surfactant.

The pigment dispersion may further contain at least one biocide.

The pigment dispersion may further contain at least one pH adjuster.

The dispersant is used in the pigment dispersion in an amount of about 5 wt % to about 200 wt %, preferably about 10 wt % to about 100 wt % based on the weight of the pigment.

Pigments

The pigment used in the pigment dispersion is preferably a pigment or a dye with at least one carboxylic acid group or a salt thereof.

The pigment can be black, cyan, magenta, yellow, red, orange, violet, blue, green, brown, mixtures thereof, and the like.

Suitable pigments for the color inks of the ink-jet ink set according to preferred embodiments of the present invention include: C. I. Pigment Yellow 17, C. I. Pigment Blue 27, C. I. Pigment Red 49:2, C. I. Pigment Red 81:1, C. I. Pigment Red 81:3, C. I. Pigment Red 81:x, C. I. Pigment Yellow 83, C. I. Pigment Red 57:1, C. I. Pigment Red 49:1, C. I. Pigment Violet 23, C. I. Pigment Green 7, C. I. Pigment Blue 61, C. I. Pigment Red 48:1, C. I. Pigment Red 52:1, C. I. Pigment Violet 1, C. I. Pigment White 6, C. I. Pigment Blue 15, C. I. Pigment Yellow 12, C. I. Pigment Blue 56, C. I. Pigment Orange 5, C. I. Pigment Yellow 14, C. I. Pigment Red 48:2, C. I. Pigment Blue 15:3, C. I. Pigment Yellow 1, C. I. Pigment Yellow 3, C. I. Pigment Yellow 13, C. I. Pigment Orange 16, C. I. Pigment Yellow 55, C. I. Pigment Red 41, C. I. Pigment Orange 34, C. I. Pigment Blue 62, C. I. Pigment Red 22, C. I. Pigment Red 170, C. I. Pigment Red 88, C. I. Pigment Yellow 151, C. I. Pigment Red 184, C. I. Pigment Blue 1:2, C. I. Pigment Red 3, C. I. Pigment Blue 15:1, C.I. Pigment Blue 15:3, C.I. Pigment Blue 15:4, C. I. Pigment Red 23, C. I. Pigment Red 112, C. I. Pigment Yellow 126, C. I. Pigment Red 169, C. I. Pigment Orange 13, C. I. Pigment Red 1-10, 12, C.I. Pigment Blue 1:X, C. I. Pigment Yellow 42, C.I. Pigment Red 101, C.I. Pigment Brown 6, C. I. Pigment Brown 7, C. I. Pigment Brown 7:X, C. I. Pigment Metal 1, C. I. Pigment Metal 2, C.I. Pigment Yellow 128, C.I. Pigment Yellow 93, C.I. Pigment Yellow 74, C.I. Pigment Yellow 138, C.I. Pigment Yellow 139, C.I. Pigment Yellow 154, C. I. Pigment Yellow 185, C.I. Pigment Yellow 180, C.I. Pigment Red 122, C.I. Pigment Red 184, bridged aluminium phthalocyanine pigments, and solid solutions of pigments.

For the black ink, suitable pigment materials include carbon blacks such as Regal 400R, Mogul L, Elftex 320 from Cabot Co., or Carbon Black FW18, Special Black 250, Special Black 350, Special Black 550, Printex 25, Printex 35, Printex 55, Printex 150T from DEGUSSA Co., and C.I. Pigment Black 7 and C.I. Pigment Black 11. Additional examples of suitable pigments are disclosed in U.S. Pat. No. 5,389,133 (XEROX).

Further, the pigment may be chosen from those disclosed by HERBST, W, et al. Industrial Organic Pigments, Production, Properties, Applications, 2nd edition,. vch, 1997.

Particular preferred pigments are C.I. Pigment Yellow 1, 3, 10, 12, 13, 14, 17, 65, 73, 74, 75, 83, 93, 109, 120, 128, 138, 139, 150, 151, 154, 155, 180, 185; C.I. Pigment Red 17, 22, 23, 57:1, 122, 144, 146, 170, 176, 184, 185, 188, 202, 206, 207, 210; C.I. Pigment Violet 19 and C.I. Pigment Violet 19; C.I. Pigment Blue 15:1, C.I. Pigment Blue 15:2, C.I. Pigment Blue 15:3, C.I. Pigment Blue 15:4, and C.I. Pigment Blue 16.

In a preferred embodiment, the color inks of the ink-jet ink set are prepared using the pigments C.I. Pigment Yellow 74, C.I. Pigment Red 122, and a β-Cu Phthalocyanine pigment.

The pigment particles in the pigment dispersion should be sufficiently small, e.g., to permit free flow of an ink-jet ink containing such pigment particles through the ink-jet printing device, especially at the ejecting nozzles. It is also desirable to use small particles for maximum color strength.

The average particle size of the pigment in the pigment dispersion should preferably be between about 0.005 μm and about 15 μm. Preferably, the average pigment particle size is between about 0.005 and about 5 μm, more preferably between about 0.005 and about 1 μm, and particularly preferably between about 0.005 and about 0.3 μm. Larger pigment particle sizes may be used as long as the objectives of the present invention are achieved.

The pigment is used in the pigment dispersion in an amount of about 0.1 wt % to about 20 wt %, preferably about 1 wt % to about 10 wt % based on the total weight of the pigment dispersion.

Dispersion Medium

The dispersion medium used in the pigment dispersion is a liquid. The dispersion medium may include water and/or organic solvent(s). Preferably, the dispersion medium is water.

If the pigment dispersion is used to manufacture radiation curable inkjet inks, water and/or organic solvent(s) are replaced by one or more monomers and/or oligomers to obtain a liquid dispersion medium. Sometimes, it can be advantageous to add a small amount of an organic solvent to improve the dissolution of the dispersant. The content of organic solvent should be lower than about 20 wt % based on the total weight of the pigment dispersion.

Suitable organic solvents include alcohols, aromatic hydrocarbons, ketones, esters, aliphatic hydrocarbons, higher fatty acids, carbitols, cellosolves, and higher fatty acid esters. Suitable alcohols include methanol, ethanol, propanol and 1-butanol, 1-pentanol, 2-butanol, t.-butanol. Suitable aromatic hydrocarbons include toluene and xylene. Suitable ketones include methyl ethyl ketone, methyl isobutyl ketone, 2,4-pentanedione, and hexafluoroacetone. Also glycol, glycolethers, N-methylpyrrolidone, N,N-dimethylacetamid, N,N-dimethylformamid may be used.

Surfactant

The pigment dispersion may contain at least one surfactant. The surfactant(s) can be anionic, cationic, non-ionic, or zwitter-ionic and are usually added in a total quantity less than about 20 wt % based on the total weight of the pigment dispersion and particularly in a total less than about 10 wt % based on the total weight of the pigment dispersion.

Suitable surfactants for the pigment dispersion include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkyl phenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.

Biocide

Suitable biocides for the pigment dispersion of preferred embodiments of the present invention include sodium dehydroacetate, 2-phenoxyethanol, sodium benzoate, sodium pyridinethion-1-oxide, ethyl p-hydroxybenzoate, and 1,2-benzisothiazolin-3-one and salts thereof.

A preferred biocide for the ink-jet ink of the present invention is Proxel™ GXL available from ZENECA COLOURS.

A biocide is preferably added in an amount of about 0.001 wt % to about 3 wt %, more preferably about 0.01 wt % to about 1.00 wt. %, each based on the total weight of the pigment dispersion.

pH Adjuster

The pigment dispersion may contain at least one pH adjuster. Suitable pH adjusters include NaOH, KOH, NEt$_3$, NH$_3$, HCl, HNO$_3$, and H$_2$SO$_4$. Preferred pH adjusters used in the preparation of precipitation dispersions are NaOH and H$_2$SO$_4$.

Preparation of Pigment Dispersions

The pigment dispersion may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

In a preferred embodiment, the pigment dispersion is a precipitation dispersion, wherein the pigment with at least one carboxylic acid group is first solubilized in the dispersion medium by increasing the pH above 9 and subsequently precipitating the solubilized pigment in the presence of the dispersant by addition of an acid.

Very fine dispersions of pigments and methods for their preparation are disclosed in e.g., EP 776952 A (KODAK), U.S. Pat. No. 5,538,548 (BROTHER), U.S. Pat. No. 5,443,628 (VIDEOJET SYSTEMS), EP 259130 A (OLIVETTI), U.S. Pat. No. 5,285,064 (EXTREL), EP 429828 A (CANON), and EP 526198 A (XEROX).

Spectral Separation Factor

The spectral separation factor SSF was found to be an excellent measure to characterize an ink-jet ink, as it takes into account properties related to light-absorption (e.g., wavelength of maximum absorbance $\lambda_{max}$, shape of the absorption spectrum and absorbance-value at $\lambda_{max}$) as well as properties related to the dispersion quality and stability.

A measurement of the absorbance at a higher wavelength gives an indication on the shape of the absorption spectrum. The dispersion quality can be evaluated based on the phenomenon of light scattering induced by solid particles in solutions. Light scattering in pigment inks may be detected as an increased absorbance at higher wavelengths than the absorbance peak of the actual pigment. The dispersion stability can be evaluated by comparing the SSF before and after a heat treatment of, e.g., 4 hours at 60° C. or a week at 80° C.

The spectral separation factor SSF of the ink is calculated by using the data of the recorded spectrum of an ink solution or a jetted image on a substrate and comparing the maximum absorbance to the absorbance at a reference wavelength. The spectral separation factor is calculated as the ratio of the maximum absorbance $A_{max}$ over the absorbance $A_{ref}$ at the reference wavelength.

$$SSF = \frac{A_{max}}{A_{ref}}$$

The SSF is an excellent tool to design ink-jet ink sets with a large color gamut. Often ink-jet ink sets are now commercialized, wherein the different inks are not sufficiently matched with each other. For example, the combined absorption of all inks does not give a complete absorption over the whole visible spectrum, e.g., "gaps" exist between the absorption spectra of the colorants. Another problem is that an ink might be absorbing in the range of another ink. The resulting color gamut of these ink-jet ink sets is low or mediocre.

EXAMPLES

Materials

All materials used in the following examples were readily available from standard sources such as Aldrich Chemical Co. (Belgium) and Acros (Belgium) unless otherwise specified.

The water used was deionized water.
4-Hydroxybenzoic acid is from Bayer.
THF is from Acros.
Methacryloyl chloride is from Aldrich.
EtOAc is from Acros.
Hexane is from Acros.
"Initiator" used in the synthesis examples came from Aldrich.
STY is styrene from Acros.
BnMA is benzylmethacrylate from Acros.
BuA is n-butylacrylate from Acros.
Pigment Yellow is C.I. Pigment yellow 74 from Clariant.
Pigment Magenta is C.I. Pigment Red 122 from Clariant.
Pigment Cyan is C.I. Pigment Blue 15:3 from Sun Chemical.
1,2-Hexanediol is from Degussa.
PROXEL™ Ultra 5 is from Avecia.
SURFYNOL™ 104H is from Air Products.

Measurement Methods

1. SSF Factor

A spectrophotometric measurement of the UV-VIS-NIR absorption spectrum of the diluted ink was performed in transmission-mode with a double beam-spectrophotometer using the settings of Table 1. The measurement used quartz cells with a path length of 10 mm and water was chosen as a blank.

TABLE 1

| Mode | Absorbance |
| --- | --- |
| Wavelength range | 240-1100 nm |
| Slit width | 3.0 nm |
| Scan interval | 1.0 nm |
| Detector | photo-multiplier (UV-VIS) |
|  | PbS-detektor (NIR |

The ink was diluted to have a pigment concentration of 0.002% if the absorbance maximum was between 400 nm and 600 nm or to have a pigment concentration of 0.005% if the absorbance maximum was between 600 and 700 nm.

The spectral separation factor (SSF) of the ink was calculated, using the data of the recorded spectrum. The maximum absorbance was compared to the absorbance at a reference wavelength. The choice of this reference wavelength was dependent on the pigment used:

if the color ink had a maximum absorbance $A_{max}$ between 400 nm and 500 nm then the absorbance $A_{ref}$ was determined at a reference wavelength of 600 nm, If the color ink had a maximum absorbance $A_{max}$ between 500 nm and 600 nm then the absorbance $A_{ref}$ was determined at a reference wavelength of 650 nm, If the color ink had a maximum absorbance $A_{max}$ between 600 nm and 700 nm then the absorbance $A_{ref}$ was determined at a reference wavelength of 830 nm.

The spectral separation factor was calculated as the ratio of the maximum absorbance $A_{max}$ over the absorbance $A_{ref}$ at the reference wavelength.

$$SSF = \frac{A_{max}}{A_{ref}}$$

The higher the value of SSF, the better the dispersion quality. A value of at least 30.0 is needed for good pigment dispersion quality.

2. Dispersion Stability

The dispersion stability was evaluated by comparing the SSF before and after a severe heat treatment of 1 week at 80° C. Pigment dispersions exhibiting excellent dispersion stability have a SSF value after heat treatment still larger than 30.0 and preferably a % reduction in SSF smaller than 30%.

3. Polymer Analysis

All polymers have been characterized with gel permeation chromatography (GPC) and nuclear magnetic resonance spectroscopy (NMR). Random or block copolymers were analyzed with NMR by dissolving them in a deuterated solvent. For $^1$H-NMR ±20 mg polymer was dissolved in 0.8 mL $CDCl_3$ or DMSO-d6 or acetonitrile-d3 or $D_2O$ (with or without NaOD addition). Spectra were recorded on a Varian Inova 400 MHz instrument equipped with an ID-probe. For $^{13}$C-NMR ±200 mg polymer was dissolved in 0.8 mL $CDCl_3$ or DMSO-d6 or acetonitrile-d3 or $D_2O$ (with or without NaOD addition). Spectra were recorded on a Varian Gemini 2000 300 MHz equipped with a SW-probe.

$M_n$, $M_w$, $M_z$ and polydispersity (pd) values were measured using gel permeation chromatography. For polymers dissolvable in organic solvents PL-mixed B columns (Polymer Laboratories Ltd) were used with either THF or THF+5% acetic acid as mobile phase using polystyrene with known molecular weights as calibration standards. These polymers were dissolved in the mobile phase at a concentration of 1 mg/mL. For polymers dissolvable in water PL Aquagel OH-60, OH-50, OH-40 and/or OH-30 (Polymer Laboratories Ltd) column combinations were used depending on the molecular weight region of the polymers under investigation. As mobile phase water/methanol mixtures adjusted to pH 9.2 with, e.g., disodiumhydrogen phosphate were used with or without the addition of neutral salts, e.g., sodium nitrate. As calibration standards polyacrylic acids with known molecular weights were used. The polymers were dissolved in either water or water made basic with ammonium hydroxide at a concentration of 1 mg/mL. Refractive index detection was used.

Some examples are now given to illustrate the calculation of the composition of the (block)copolymers and segmented oligomers:

Determination of the average composition of a random (=statistical) copolymer P(MAA-c-EHA):

Determine $M_n$ of copolymer with GPC=>$M_n$=5000

Determine molar percentage of each monomer type by NMR=>45 mol % MAA and 55 mol % EHA $(0.45 \times M_{MAA}) + (0.55 \times M_{EHA}) = 140.09$ 5000/140.09=total number of monomeric units in average polymer chain=36

Average number of MAA units=0.45×(5000/140.09)=16 units

Average number of EHA units=0.55×(5000/140.09)=20 units

Thus, the average composition is $P(MAA_{16}\text{-c-}EHA_{20})$.

Determination of the Average Composition of AB Block Copolymer P(AA-b-BnA):

The block copolymer was prepared via ATRP. First, a PtBA macro-initiator was prepared: $M_n$ of this macro-initiator (based on NMR) is 6600 g/mol. Thus, the block length is $6600/M_{tBA}$=51 tBA units. Subsequently, the second block is prepared using BnA. Applying NMR the molar ratio between the two monomer types can be determined: 65/35 (tBA/BnA). Thus, the average composition of the block copolymer is $P(tBA_{51}\text{-b-}BnA_{27})$. After hydrolysis of the tBA units, the final composition of the fully unprotected block copolymer is $P(AA_{51}\text{-b-}BnA_{27})$ Example 1

This example illustrates the synthesis via RAFT methodology of AB block copolymers and segmented oligomers having a polymeric A segment of polymerized methacryloyloxybenzoic acid (MAOBA) and different types of B segments.

Synthesis of RAFT Agent

Synthesis scheme:.

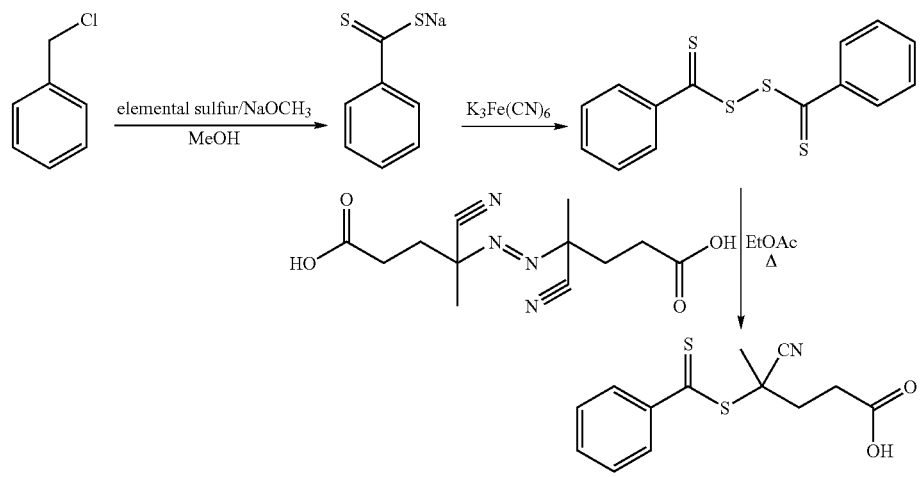

Synthesis of Dithiobenzoic Acid (DTBA)

To a thoroughly dried 1 L, three-necked round-bottomed flask equipped with a magnetic stir bar, addition funnel (250.0 mL), thermometer, and rubber septum for liquid transfers was added sodium methoxide (30% solution in methanol, 180.0 g). Anhydrous methanol (250.0 g) was added to the flask via cannula, followed by rapid addition of elemental sulphur (32.0 g). Benzyl chloride (63.0 g) was then added drop wise via the addition funnel over a period of one hour at room temperature under a dry nitrogen atmosphere. The reaction mixture was heated in an oil bath at 67° C. for 10 hours. After this time, the reaction mixture was cooled to 7° C. using an ice bath. The precipitated salt was removed by filtration and the solvent removed in vacuum. To the residue was added deionized water (500.0 mL). The solution was filtered a second time and then transferred to a 2 L separatory funnel. The crude sodium dithiobenzoate solution was washed three times with diethyl ether (200.0 mL). Diethyl ether (200.0 mL) and 1.0 N HCl (500.0 mL) were added, and dithiobenzoic acid was extracted into the ethereal layer. Deionized water (300.0 mL) and 1.0 N NaOH (600.0 mL) were added, and sodium dithiobenzoate was extracted to the aqueous layer. This washing process was repeated to finally yield a solution of sodium dithiobenzoate.

Synthesis of di(thiobenzoyl)disulfide

Potassium ferricyanide (III) (32.93 g) was dissolved in deionized water (500.0 mL). Sodium dithiobenzoate solution (350.0 mL) was transferred to a 1 L conical flask equipped with a magnetic stir bar. Potassium ferricyanide solution was added drop wise to the sodium dithiobenzoate via an addition funnel over a period of one hour under vigorous stirring. The red precipitate was filtered and washed with deionized water until the washings become colorless. The solid was dried in vacuum at room temperature overnight; the product was recrystallized from ethanol.

Synthesis of 4-cyanopentanoic Acid Dithiobenzoate

To a 250 mL round-bottomed flask was added distilled ethyl acetate (80.0 mL). To the flask was added dry 4,4'-azobis(4-cyanopentanoic acid) (5.84 g) and Di(thiobenzoyl)disulfide (4.25 g). The reaction solution was heated at reflux for 18 hours. The ethyl acetate was removed in vacuum. The crude product was isolated by column chromatography (Silicagel 60 A, 70-230 mesh) using ethyl acetate-hexane (2:3) as eluent. Fractions that were red in color were combined and dried over anhydrous sodium sulphate overnight. The solvent mixture was removed in vacuum, and the red oily residue placed in a freezer at −20° C., whereupon it crystallized. 4-cyanopentanoic acid dithiobenzoate was recrystallized from benzene.

Purification of 4-cyanopentanoic Acid Dithiobenzoate

The RAFT agent, 4-cyanopentanoic acid dithiobenzoate, was analyzed with $^1$H-NMR and found to be contaminated with different kinds of impurities (e.g., benzyl chloride). The purification of 4-cyanopentanoic acid dithiobenzoate was carried out using a HPLC column, Prochrom LC80 (l=25 cm, d=8 cm) filled with Kromasil Si 60 Å 10 mic. A solution was made of 4-cyanopentanoic acid dithiobenzoate in a mixture of ethyl acetate and n-hexane (1:2.33). From the chromatogram it was obvious that only the main peak after 14-17 minutes represented the desired product, 4-Cyanopentanoic acid dithiobenzoate, and was therefore separated from the rest of the solution. After evaporating most of the solvent, a bit of hexane added. In the refrigerator, the product crystallized overnight. The crystals are dried in the vacuum oven. The vessel with the RAFT agent inside was densely closed and stored in the refrigerator in order to prevent hydrolysis.

Synthesis of Monomer MAOBA

Synthesis scheme:

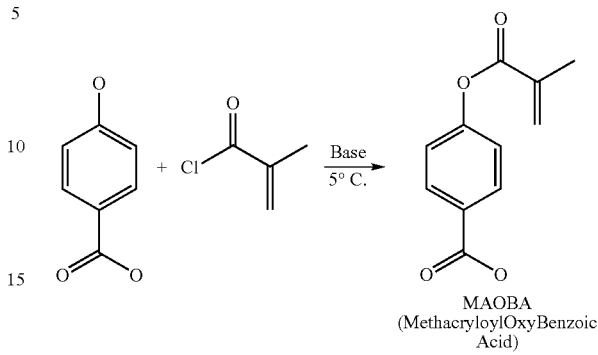

MAOBA
(MethacryloylOxyBenzoic Acid)

4-Hydroxybenzoic acid (138 g, 1.0 mol) was dissolved in 250 mL THF+1500 mL ice water by adding 220 mL NaOH (10N, 2.2 equiv.). Methacryloyl chloride (108 mL, 1.12 equiv.) was then added drop wise over 60 minutes during which period the temperature was kept below 5° C. After addition, stirring was continued for another 30 minutes. The reaction mixture was then poured into aqueous HCl (5000 mL ice water+100 mL conc. HCl), the product was filtered off and washed with water. After drying, the product was finally recrystallized from 1600 mL EtOAc+400 mL hexane and dried. Yield was 104 g (50%).

Synthesis of the MAOBA-based Macro-initiator

Synthesis scheme:

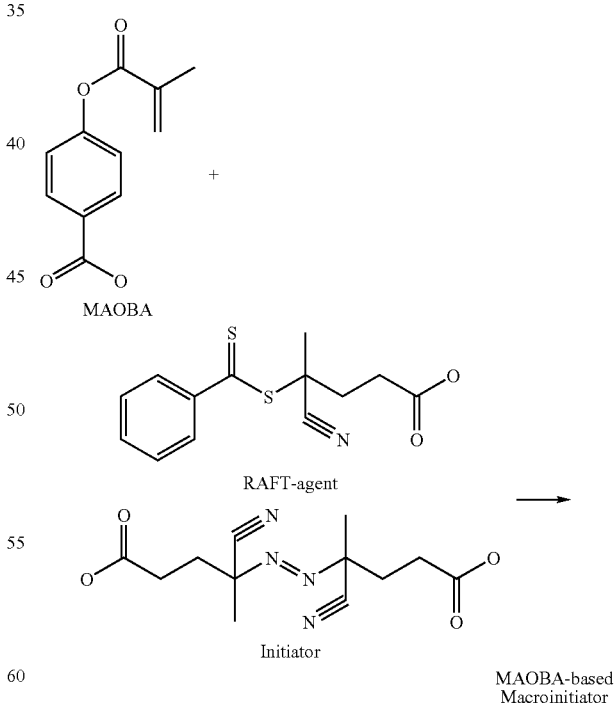

a. Target Degree of Polymerization DP=10

MAOBA monomer (35 g, 0.170 mol) was dissolved in 150 mL EtOH. RAFT-agent (4.74 g, 0.10 equiv.) and initiator (0.634 g) were added and the mixture was de-aerated for 60 minutes with $N_2$. The reaction mixture was then brought to reflux and heated for 6 hours. After this period of time the reaction was stopped to avoid side reactions. After cooling to 20° C., the solvent (EtOH) was evaporated and the residue was stirred with $CH_2Cl_2$. The MAOBA-based macro-initiator was subsequently filtered, washed with $CH_2Cl_2$ and dried. Yield was 35.3 g (89%). GPC-result: Mn=2674; Mw=5049; pd=1.89 (aqueous GPC; calibrated vs. PSSA-standards). DP=9 (based on conversion, yield and GPC)

b. Target degree of polymerization DP=25

MAOBA monomer (35 g, 0.170 mol) was dissolved in 150 mL EtOH. RAFT-agent (1.90 g, 0.04 equiv) and initiator (0.634 g) were added and the mixture was deaerated for 60 minutes with $N_2$. The reaction mixture was then brought to reflux and heated for 6 hours. After this period of time the reaction was stopped to avoid side reactions. After cooling to 20° C., the solvent (EtOH) was evaporated and the residue was stirred with $CH_2Cl_2$. The MAOBA-based macro-initiator was subsequently filtered, washed with $CH_2Cl_2$ and dried. Yield was 35.1 g (96%). GPC-result: Mn=4884; Mw=8279; pd=1.70 (aqueous GPC; calibrated vs. PSSA-standards). DP=24 (based on conversion, yield and GPC)

Synthesis of Polymeric Dispersant PMAOBA-b-PS

Synthesis scheme:

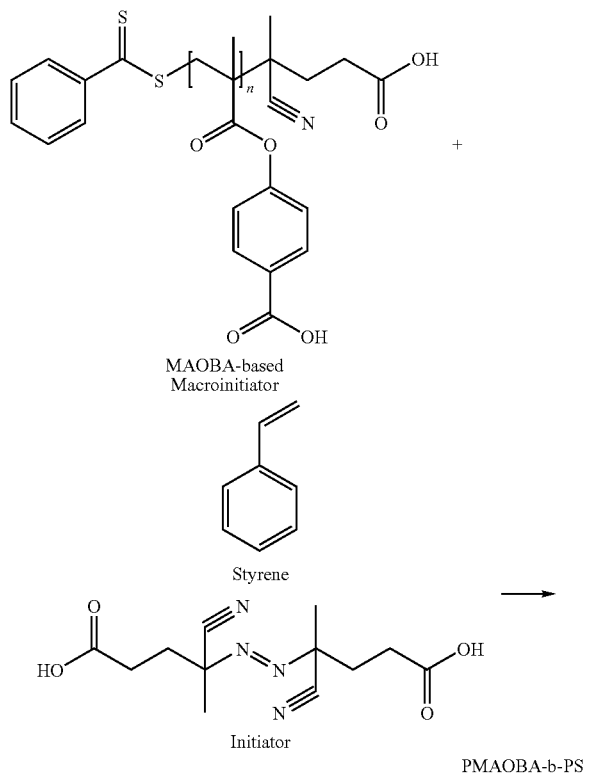

PMAOBA-b-PS

The MAOBA-based macro-initiator (target DP=10; 3.08 g, 0.865 mmol) was dissolved in 20 mL EtOH. Styrene (2.25 g, target block length DP=25) and initiator (0.081 g) were added and the mixture was deaerated for 60 minutes with $N_2$. The reaction mixture was then brought to reflux and heated for 6 hours. After this period of time, the reaction was stopped to avoid side reactions. After cooling to 20° C., the solvent (EtOH) was evaporated and the residue was stirred with $CH_2Cl_2$. The polymeric dispersant PMAOBA-b-PS was subsequently filtered, washed with $CH_2Cl_2$ and dried. Yield was 3.45 g (65%).

Analytical results: GPC: Mn=2428; Mw=5362; pd=2.21 (aqueous GPC; calibrated vs. PSSA-standards) NMR: mol ratio MAOBA/STY=68/32. Calculation gives $PMAOBA_9$-b-$PS_5$ based on composition of the macro-initiator and NMR ratio of the segmented oligomer.

Synthesis of Polymeric Dispersant PMAOBA-b-PBnMA

Synthesis scheme:

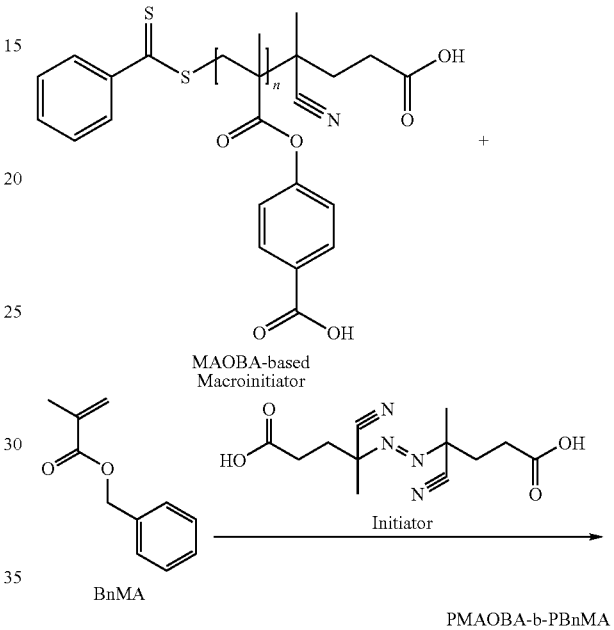

PMAOBA-b-PBnMA a. Target Degree of Polymerization: 25-10

The MAOBA-based macro-initiator (target DP=25; 5.90 g, 1.078 mmol) was dissolved in 35 mL EtOH. Benzylmethacrylate (1.90 g, target block length DP=10) and initiator (0.040 g) were added and the mixture was deaerated for 60 minutes with $N_2$. The reaction mixture was then brought to reflux and heated for 6 hours. After this period of time the reaction was stopped to avoid side reactions. After cooling to 20° C., acetone was added and the mixture was precipitated in n-hexane. The product was subsequently filtered, washed with n-hexane and dried. Yield was 6.8 g (87%).

Analytical results: GPC: Mn=5397; Mw=9427; pd=1.75 (aqueous GPC; calibrated vs. PSSA-standards) NMR: mol ratio MAOBA/BnMA=74/26 Calculation gives $PMAOBA_{24}$-b-$PBnMA_8$ based on composition of the macro-initiator and NMR ratio of the block copolymer.

b. Target Degree of Polymerization: 10-10

The MAOBA-based macro-initiator (target DP=10; 5.56 g, 1.56 mmol) was dissolved in 35 mL EtOH. Benzylmethacrylate (2.75 g, target block length DP=10) and initiator (0.058 g) were added and the mixture was deaerated for 60 minutes with $N_2$. The reaction mixture was then brought to reflux and heated for 6 hours. After this period of time the reaction was stopped to avoid side reactions. After cooling to 20° C., acetone was added and the mixture was precipitated in n-hexane. The product was subsequently filtered, washed with n-hexane and dried. Yield was 7.4 g (89%).

Analytical results: GPC: Mn=3440; Mw=6350; pd=1.85 (aqueous GPC; calibrated vs. PSSA-standards) NMR: mol ratio MAOBA/BnMA=66/34 Calculation gives PMAOBA$_9$-b-PBnMA$_5$ based on composition of the macro-initiator and NMR ratio of the segmented oligomer.

Synthesis of Polymeric Dispersant PMAOBA-b-PBuA

Synthesis scheme:

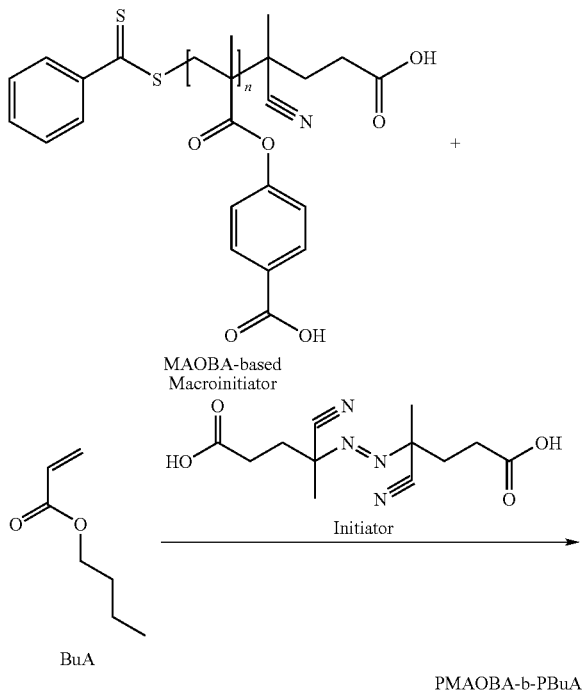

a. Target Degree of Polymerization: 25-20

The MAOBA-based macro-initiator (target DP=25; 3.41 g, 0.624 mmol) was dissolved in 30 mL EtOH. n-Butylacrylate (1.60 g, target block length DP=20) and initiator (0.047 g) were added and the mixture was deaerated for 60 minutes with N$_2$. The reaction mixture was then brought to reflux and heated for 6 hours. After this period of time, the reaction was stopped to avoid side reactions. After cooling to 20° C., acetone was added and the mixture was precipitated in n-hexane. The product was subsequently filtered, washed with n-hexane and dried. Yield was 3.5 g (70%).

Analytical results: GPC: Mn=3843; Mw=8844; pd=2.30 (aqueous GPC; calibrated vs. PSSA-standards) NMR: mol ratio MAOBA/BuA=81/19 Calculation gives PMAOBA$_{24}$-b-PBuA$_6$ based on composition of the macro-initiator and NMR ratio of the block copolymer.

b. Target Degree of Polymerization: 25-10

The MAOBA-based macro-initiator (target DP=25; 4.27 g, 0.780 mmol) was dissolved in 30 mL EtOH. n-Butylacrylate (1.00 g, target block length DP=10) and initiator (0.044 g) were added and the mixture was deaerated for 60 minutes with N$_2$. The reaction mixture was then brought to reflux and heated for 6 hours. After this period of time the reaction was stopped to avoid side reactions. After cooling to 20° C., acetone was added and the mixture was precipitated in n-hexane. The product was subsequently filtered, washed with n-hexane and dried. Yield was 4.0 g (75%).

Analytical results: GPC: Mn=5275; Mw=9083; pd=1.72 (aqueous GPC; calibrated vs. PSSA-standards) NMR: mol ratio MAOBA/BuA=92/8 Calculation gives PMAOBA$_{24}$-b-PBuA$_2$ based on composition of the macro-initiator and NMR ratio of the segmented oligomer.

c. Target Degree of Polymerization: 10-20

The MAOBA-based macro-initiator (target DP=10; 5.42 g, 1.52 mmol) was dissolved in 35 mL EtOH. Butylacrylate (3.90 g, target block length DP=20) and initiator (0.114 g) were added and the mixture was deaerated for 60 minutes with N$_2$. The reaction mixture was then brought to reflux and heated for 6 hours. After this period of time, the reaction was stopped to avoid side reactions. After cooling to 20° C., acetone was added and the mixture was precipitated in n-hexane. The product was subsequently filtered, washed with n-hexane and dried. Yield was 6.0 g (65%).

Analytical results: GPC: Mn=2306; Mw=5894; pd=2.55 (aqueous GPC; calibrated vs. PSSA-standards) NMR: mol ratio MAOBA/BuA=70/30 Calculation gives PMAOBA$_9$-b-PBuA$_4$ based on composition of the macro-initiator and NMR ratio of the segmented oligomer.

d. Target Degree of polymerization: 10-10

The MAOBA-based macro-initiator (target DP=10; 6.11 g, 1.72 mmol) was dissolved in 35 mL EtOH. Butylacrylate (2.20 g, target block length DP=10) and initiator (0.096 g) were added and the mixture was deaerated for 60 minutes with N$_2$. The reaction mixture was then brought to reflux and heated for 6 hours. After this period of time, the reaction was stopped to avoid side reactions. After cooling to 20° C., acetone was added and the mixture was precipitated in n-hexane. The product was subsequently filtered, washed with n-hexane and dried. Yield was 6.6 g (80%).

Analytical results: GPC: Mn=2548; Mw=5803; pd=2.28 (aqueous GPC; calibrated vs. PSSA-standards) NMR: mol ratio MAOBA/BuA=82/18 Calculation gives PMAOBA$_9$-b-PBuA$_2$ based on composition of the macro-initiator and NMR ratio of the segmented oligomer.

Synthesis of Polymeric Dispersant PMAOBA-b-PSSA

Synthesis scheme:

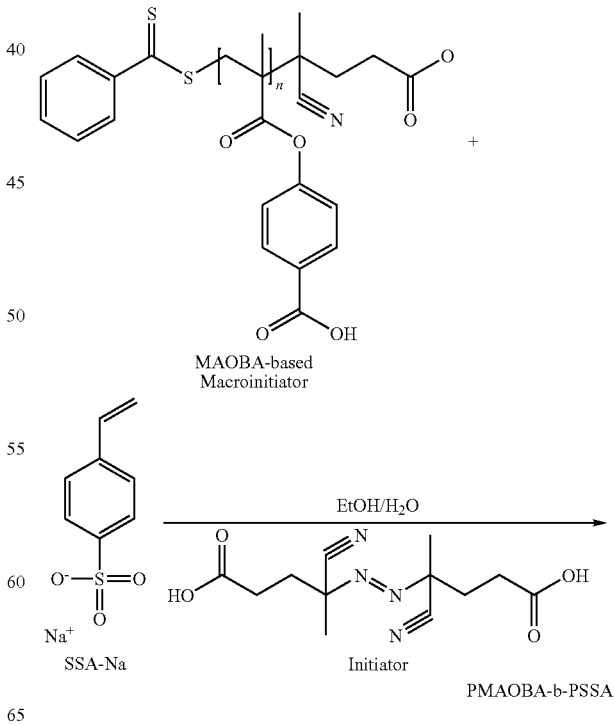

Target Degree of Polymerization: 10-25

The MAOBA-based macro-initiator (target DP=10; 2.76 g, 0.776 mmol) was dissolved in 20 mL EtOH. A solution of styrenesulfonic acid sodium salt (4.0 g, target block length DP=25) in 30 mL water and initiator (0.072 g) were added and the mixture was deaerated for 60 minutes with $N_2$. The reaction mixture was then brought to reflux and heated for 6 hours. After this period of time, the reaction was stopped to avoid side reactions. After cooling to 20° C. the mixture was dialyzed (tube MWCO=1000) for 48 hours. The product was finally isolated by freeze-drying. Yield was 5.0 g (80%).

Analytical results: GPC: Mn=3791; Mw=8757; pd=2.31 (aqueous GPC; calibrated vs. PSSA-standards) NMR: mol ratio MAOBA/SSA=43/57 Calculation gives PMAOBA$_9$-b-PSSA$_{12}$ based on composition of the macro-initiator and NMR ratio of the segmented oligomer.

Synthesis of P(MAOBA-c-MAOBBA)-b-PSSA
Synthesis of Monomer Mixture MAOBA/MAOBBA

Synthesis scheme:

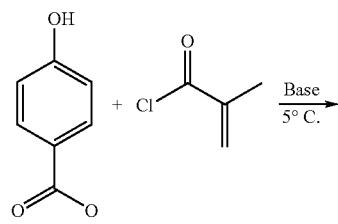

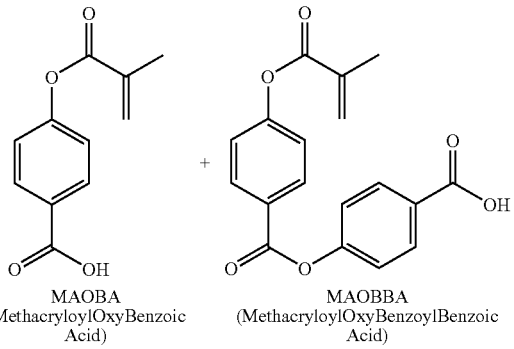

MAOBA (MethacryloylOxyBenzoic Acid)

MAOBBA (MethacryloylOxyBenzoylBenzoic Acid)

4-Hydroxybenzoic acid (69 g, 0.5 mol) was dissolved in 500 mL $CH_2Cl_2$ by adding 140 mL $NEt_3$ (2.0 equiv.). The resulting solution was cooled to 5° C. methacryloyl chloride (53.2 mL, 1.12 equiv.) was added drop-wise over 60 minutes during which period the temperature was kept below 15° C. After addition, stirring was continued for another 60 minutes. The reaction mixture was then poured into aqueous HCl (2000 mL ice water+50 mL conc. HCl), the organic phase was isolated and filtrated over a silica-layer using $CH_2Cl_2$ as eluent. The product was finally isolated by evaporation the solvent ($CH_2Cl_2$).

Yield: 38 g (37%). Analysis by NMR and GC: 2 products in ratio MAOBA/MAOBBA=2/1

Synthesis of Macro-initiator Copolymer P(MOABA-c-MAOBBA)

Synthesis scheme:

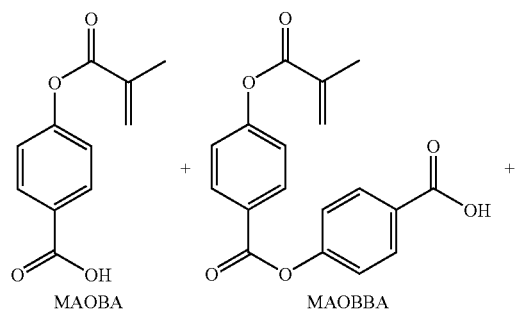

MAOBA          MAOBBA

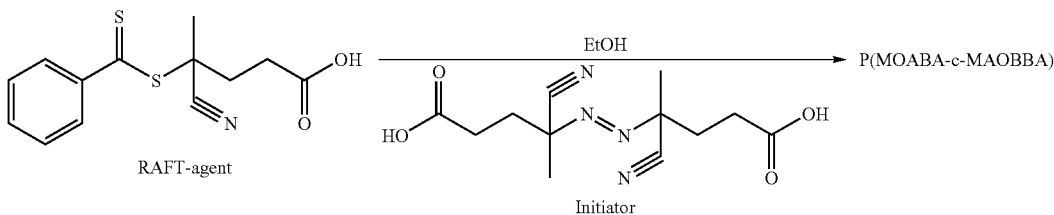

RAFT-agent          Initiator          P(MOABA-c-MAOBBA)

Target Degree of Polymerization: 25.

MAOBA/MAOBBA monomer mixture (5.0 g, 0.024 mol) was dissolved in 25 mL EtOH. RAFT-agent (0.34 g, 0.04 equiv.) and initiator (0.09 g) were added and the mixture was de-aerated for 60 minutes with $N_2$. The reaction mixture was then brought to reflux and heated for 6 hours. After this period of time, the reaction was stopped to avoid side reactions. After cooling to room temperature, the solvent (EtOH) was evaporated and the residue was stirred with $CH_2Cl_2$. The macro-initiator was subsequently filtered, washed with $CH_2Cl_2$ and dried.

Yield: 3.3 g (66%). GPC-result: Mn=5752; Mw=6675; pd=1.16 (vs. PS standards) DP=17 (P(MAOBA$_{13}$-c-MAOBBA$_4$)) based on conversion and yield.

Synthesis of P(MAOBA-c-MAOBBA)-b-PSSA

Synthesis scheme:

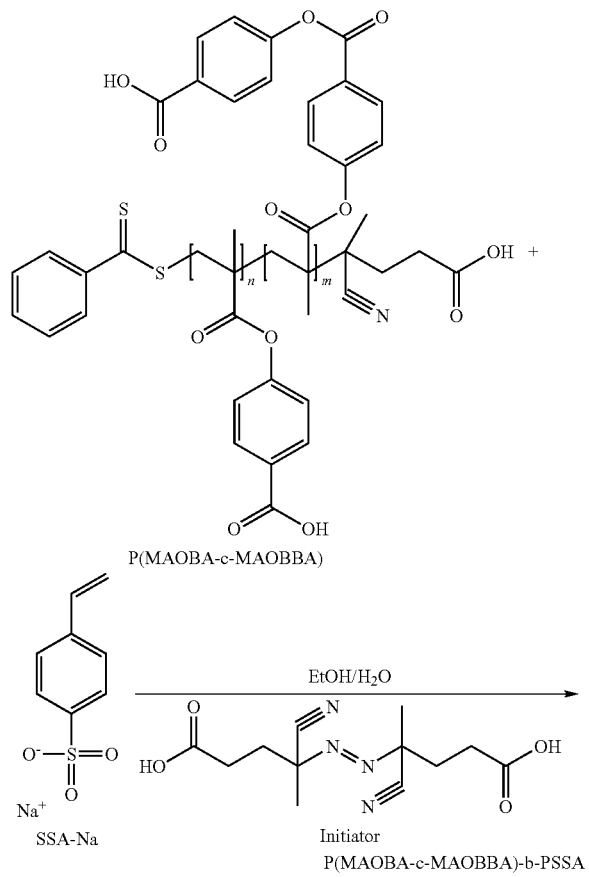

P(MAOBA-c-MAOBBA)-b-PSSA

Target Degree of Polymerization: 25-30

The MAOBA/MAOBBA-based macro-initiator (target DP=25; 3.07 g, 0.533 mmol) was dissolved in 15 mL EtOH. A solution of styrenesulfonic acid sodium salt (3.07 g, target block length DP=30) in 15 mL water and initiator (0.060 g) were added and the mixture was deaerated for 60 minutes with $N_2$. The reaction mixture was then brought to reflux and heated for 6 hours. After this period of time, the reaction was stopped to avoid side reactions. After cooling to room temperature, the mixture was dialyzed (tube MWCO=1000) for 48 hours. The product was finally isolated by evaporation of the water and treated with $CH_2Cl_2$.

Yield: 4.8 g (76%). Analytical results: GPC: Mn=2694; Mw=8633; pd=3.20 (aqueous GPC; calibrated vs. PSSA-standards) NMR:mol ratio MAOBA/MAOBBA/SSA=33/11/56 Recalculation gives P (MAOBA$_{13}$-c-MAOBBA$_4$)-b-PSSA$_{22}$ based on composition of the macro-initiator and NMR ratio of the block copolymer.

Example 2

This example illustrates the advantages of the block copolymers and segmented oligomers synthesized in Example 1 as a polymeric dispersant in pigment dispersions.

The dispersants DISP-1 to DISP-8 according to Table 2, wherein x and y represent the number of monomers in each segment of the polymeric dispersant, were used to prepare ink-jet inks. DISP-1 is a homopolymer of MAOBA (the MAOBA-based macro-initiator of Example 1) and serves as comparison.

TABLE 2

| Dispersant | Polymeric dispersant | x | y |
|---|---|---|---|
| DISP-1 | PMAOBA$_x$ (Homopolymer) | 9 | — |
| DISP-2 | PMAOBA$_x$-b-PS$_y$ | 9 | 5 |
| DISP-3 | PMAOBA$_x$-b-PBnMA$_y$ | 24 | 8 |
| DISP-4 | PMAOBA$_x$-b-PBnMA$_y$ | 9 | 5 |
| DISP-5 | PMAOBA$_x$-b-PBuA$_y$ | 24 | 6 |
| DISP-6 | PMAOBA$_x$-b-PBuA$_y$ | 24 | 2 |
| DISP-7 | PMAOBA$_x$-b-PBuA$_y$ | 9 | 4 |
| DISP-8 | PMAOBA$_x$-b-PBuA$_y$ | 9 | 2 |

Preparation of the Pigment Dispersion

All pigment dispersions were prepared in the same manner to obtain a composition as described in Table 3, except that different pigments and dispersants were used. The prepared pigment dispersions were suitable for ink-jet printing.

TABLE 3

| Component | wt % |
|---|---|
| Pigment | 4.00 |
| Dispersant | 2.40 |
| 1,2-propanediol | 21.00 |
| Glycerol | 7.00 |
| PROXEL ™ Ultra 5 | 0.80 |
| SURFYNOL ™ 104H | 0.09 |
| Water | 64.71 |

An ink composition was made by mixing the pigment, the dispersant and about half of the water with a dissolver and treating this mixture with an Eiger bead mill subsequently. Under stirring, the surfactant SURFYNOL™ 104H and the biocide PROXEL™ Ultra 5, glycerol and 1,2-propanediol were added. The ink was filtered through a 1µ MILLIPORE™ filter.

Using the above method, the comparative samples COMP-1 to COMP-3 and the inventive samples INV-1 to INV-21 were prepared according to Table 4. The spectral separation factor (SSF) was determined for each sample directly after preparation and was determined again after a severe heat treatment of 1 week at 80° C. The results are listed in Table 4.

TABLE 4

| Sample | Dispersant | Pigment | SSF | SSF aged | Reduction in SSF |
|---|---|---|---|---|---|
| COMP-1 | DISP-1 | Pigment Yellow | 2 | Gel | — |
| INV-1 | DISP-2 | Pigment Yellow | 162 | 84 | 48% |
| INV-2 | DISP-3 | Pigment Yellow | 350 | 81 | 77% |
| INV-3 | DISP-4 | Pigment Yellow | 367 | 118 | 68% |
| INV-4 | DISP-5 | Pigment Yellow | 365 | 53 | 85% |
| INV-5 | DISP-6 | Pigment Yellow | 370 | 67 | 82% |
| INV-6 | DISP-7 | Pigment Yellow | 20 | 5 | 75% |
| INV-7 | DISP-8 | Pigment Yellow | 159 | 4 | 97% |
| COMP-2 | DISP-1 | Pigment Magenta | 5 | Gel | — |
| INV-8 | DISP-2 | Pigment Magenta | 82 | 88 | 0% |
| INV-9 | DISP-3 | Pigment Magenta | 162 | 99 | 39% |
| INV-10 | DISP-4 | Pigment Magenta | 217 | 113 | 48% |
| INV-11 | DISP-5 | Pigment Magenta | 102 | 125 | 0% |
| INV-12 | DISP-6 | Pigment Magenta | 138 | 160 | 0% |
| INV-13 | DISP-7 | Pigment Magenta | 42 | 17 | 60% |
| INV-14 | DISP-8 | Pigment Magenta | 34 | 9 | 74% |
| COMP-3 | DISP-1 | Pigment Cyan | 5 | Gel | — |
| INV-15 | DISP-2 | Pigment Cyan | 18 | 23 | 0% |
| INV-16 | DISP-3 | Pigment Cyan | 47 | 58 | 0% |
| INV-17 | DISP-4 | Pigment Cyan | 48 | 55 | 0% |
| INV-18 | DISP-5 | Pigment Cyan | 24 | 28 | 0% |
| INV-19 | DISP-6 | Pigment Cyan | 46 | 91 | 0% |
| INV-20 | DISP-7 | Pigment Cyan | 19 | 5 | 74% |
| INV-21 | DISP-8 | Pigment Cyan | 29 | 5 | 83% |

From Table 4, it is clear that the comparative samples COMP-1 to COMP-3 prepared with the homopolymer of MAOBA were low quality dispersions exhibiting a small SSF (less than 6) and no stability (formation of a gel). All the inventive pigment dispersions INV-1 to INV-21 exhibited a better quality and stability.

It should be noted that the number of monomers MAOBA is a parameter to improve the quality and stability of the pigment dispersion, as can be seen for the dispersant $PMAOBA_x\text{-b-}PbuAyb_y$, by comparing the results obtained for dispersants DISP-5 and DISP-6 with those obtained for dispersants DISP-7 and DISP-8. It should also be observed that the nature of the second monomer is another parameter to improve the quality and stability of the pigment dispersion further, as can be seen by comparing the results obtained for dispersants DISP-2 and DISP-4 with those obtained for dispersants DISP-7 and DISP-8, which had approximately the same number of monomers.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A polymeric dispersant having a block copolymer structure or a segmented oligomer structure, wherein the block copolymer structure or segmented oligomer structure comprises:

a segment polymerized by monomers according to Formula (I):

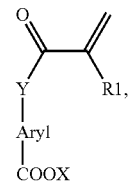

Formula (I)

wherein;

R1 represents hydrogen or methyl;

Y represents O, S, or NH;

Aryl represents an aromatic group or a heteroaromatic group; and

X represents hydrogen, an alkyl group, or a cation.

2. The polymeric dispersant according to claim 1, wherein the cation represents ammonium, sodium, potassium, lithium, or a quaternary amine.

3. The polymeric dispersant according to claim 1, wherein the monomer is represented by Formula (II):

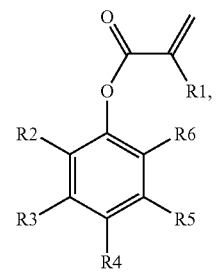

Formula (II)

wherein;

R1 represents hydrogen or methyl;

R2, R3, R4, R5, and R6 are each independently selected from the group consisting of hydrogen, alkoxy group, acyl group, carboxylic acid group, carboxylate group, alkyl, and alkenyl; and at least one of R2, R3, R4, R5, or R6 is a carboxylic acid or a salt thereof.

4. The polymeric dispersant according to claim 1, wherein the monomer used in a second segment of the polymeric dispersant is a styrene or an acrylate monomer.

5. The polymeric dispersant according to claim 1, wherein the polymeric dispersant contains at least 20 monomer units in total.

6. A pigment dispersion comprising the polymeric dispersant according to claim 1.

7. The polymeric dispersant according to claim 3, wherein the monomer is represented by

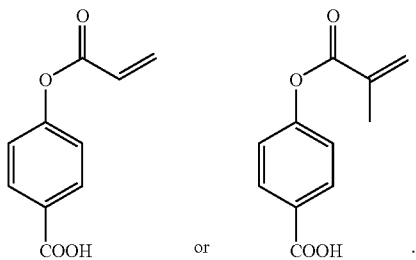

8. The polymeric dispersant according to claim 4, wherein the acrylate monomer is an alkyl acrylate or an aromatic acrylate.

9. The polymeric dispersant according to claim 4, wherein the acrylate monomer is selected from the group consisting of butylacrylate and benzyl methacrylate.

10. An ink-jet ink comprising the pigment dispersion according to claim 6.

11. A colored layer coated from a coating solution comprising the pigment dispersion according to claim 6.

12. The ink-jet ink according to claim to 10, wherein the ink-jet ink is a radiation curable ink-jet ink.

* * * * *